June 20, 1967 A. HERTZBERG ETAL 3,326,452
MULTI-STAGE METHOD OF EXPANDING A HIGH TEMPERATURE GAS
Filed July 19, 1965 2 Sheets-Sheet 1
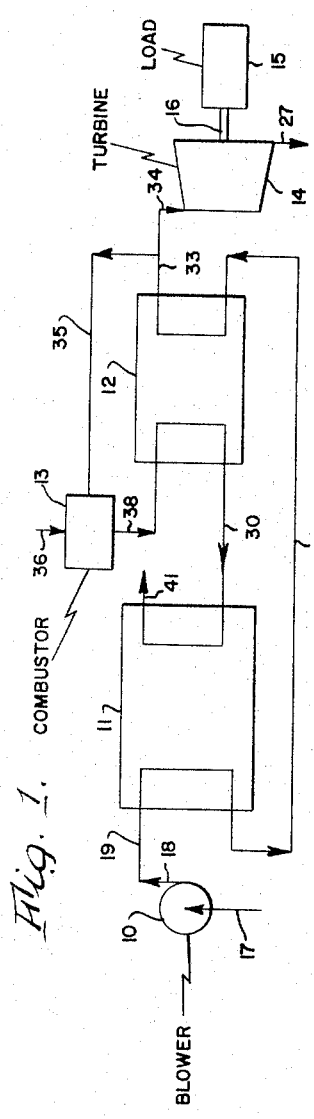
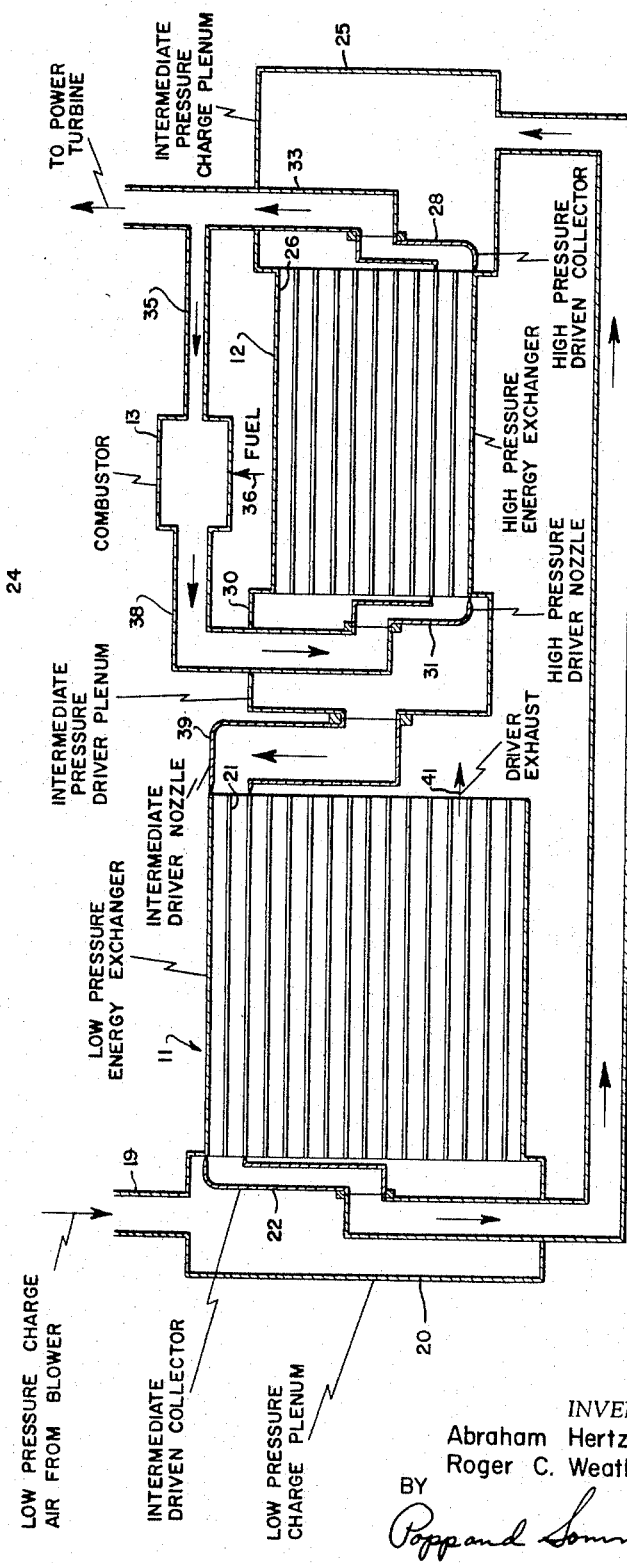
INVENTORS
Abraham Hertzberg
Roger C. Weatherston
BY
Popp and Sommer
ATTORNEYS

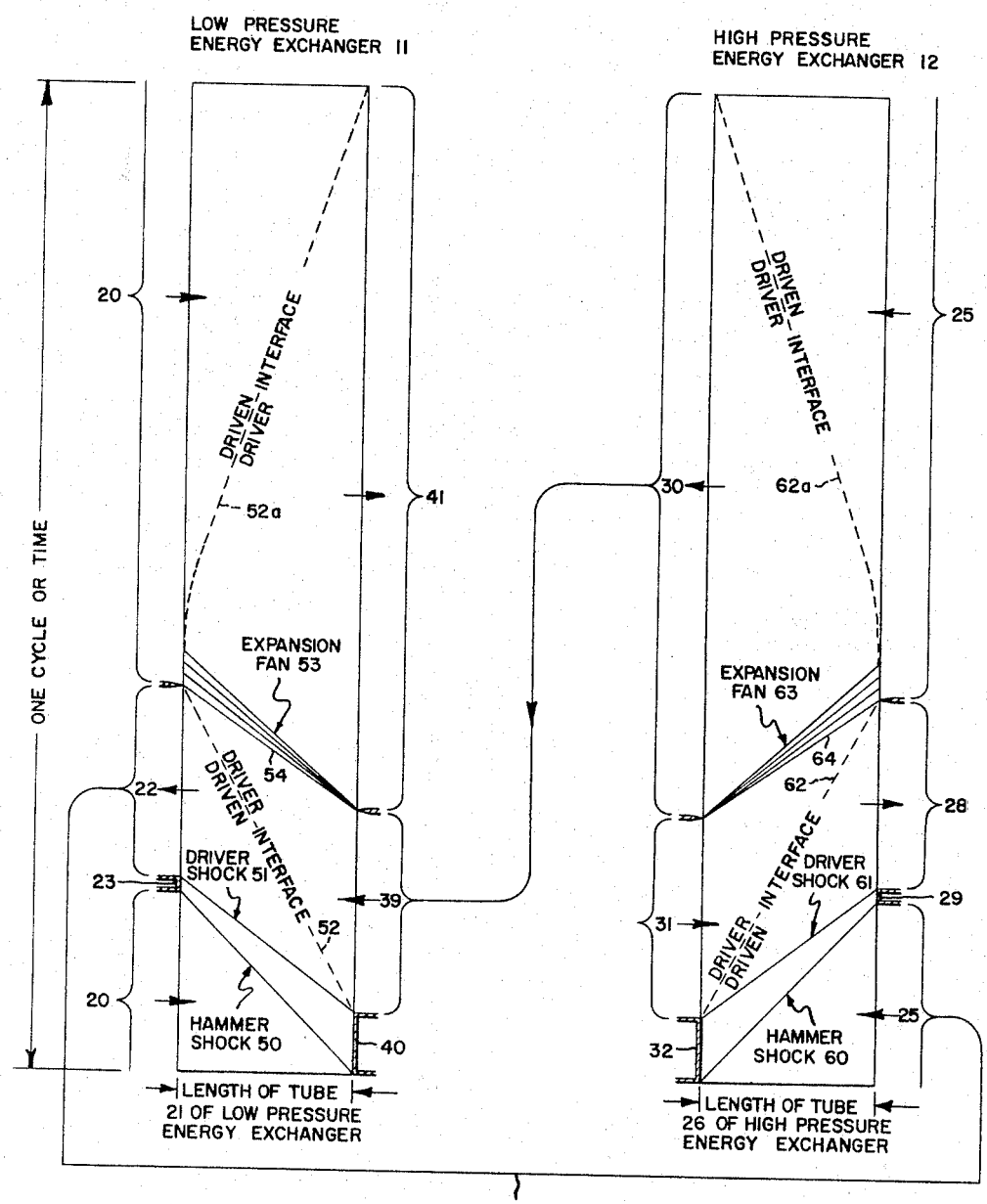

3,326,452
MULTI-STAGE METHOD OF EXPANDING A HIGH TEMPERATURE GAS

Abraham Hertzberg, Tonawanda, and Roger C. Weatherston, Williamsville, N.Y., assignors to Cornell Aeronautical Laboratory, Inc., Buffalo, N.Y., a corporation of New York
Filed July 19, 1965, Ser. No. 472,984
4 Claims. (Cl. 230—69)

This invention relates to a method of expanding a high temperature driver gas in a plurality of stages so as to transfer its energy efficiently to a driven gas.

The invention has particular application to the generation of a gaseous fluid used to drive a mechanism such as a turbine, for example, by utilizing the energy of a hot gas the temperature of which is too high to enable the hot gas to be used directly to drive the mechanism.

The primary object of the present invention is to provide a method of efficiently transferring energy from a high temperature driver gas via expansion to a driven gas which as a result is compressed and has a lower temperature.

Another important object is to provide a method of generating a gaseous drive fluid for a mechanism the practice of which method involves a comparatively low investment in capital equipment by eliminating or minimizing the need for expensive boilers or regenerators.

Other objects and advantages of the present invention will be apparent from the following detailed description of apparatus in which the inventive process may be practiced taken in conjunction with the accompanying drawings wherein:

FIG. 1 is a flow chart of a system employing two-stage energy exchanger apparatus for carrying out the inventive method.

FIG. 2 is a more detailed but still schematic view of the two-stage energy exchanger apparatus represented in FIG. 1.

FIG. 3 is a diagram illustrating the interaction of the various waves developed in each of the stages of the two-stage energy exchanger apparatus shown in FIGS. 1 and 2.

In general, the present invention involves an application of the classical Brayton cycle in which air is adiabatically compressed, heated by combustion and then expanded adiabatically in a turbine. A Brayton cycle is usually carried out in apparatus employing an air compressor, combustor and turbine which drives the compressor, and is further characterized by the lack of regenerative heating of the compressor discharge air by the hot air from the turbine exhaust. Compared to a regeneration-type cycle having the same peak cycle temperature, the Brayton cycle efficiency is lower for low compression ratios. However, as the compression ratio is increased the Brayton cycle efficiency increases but is limited by the efficiency of the components and the peak cycle temperature. If high cycle temperatures are employed in conjunction with reasonably efficient components, then attractive Brayton cycle efficiencies can be attained. Conventional turbines operating at an inlet temperature of about 1300° F. will afford a peak cycle thermal efficiency of about 26-28% at a compression ratio of 9, assuming component efficiencies to be about 85%.

A feature of the present invention is to provide a method of employing higher peak cycle temperatures than is possible in a conventional Brayton-type cycle thereby permitting higher thermal efficiency to be attained. For example, using a peak cycle temperature of about 2300° F. a thermal efficiency of about 35% can be attained. While this thermal efficiency may be lower than that which could be attained in an extensive regenerative heating gas turbine cycle there is the distinct compensating advantage of requiring less capital equipment. By comparison, no compressor is required and in its stead a comparatively inexpensive blower for low-pressure charge air may be used, no regenerator is required which constitutes the major cost of many high regeneration cycles, and the size of the turbine is reduced for the same net power because there is no compressor to drive.

In the practice of the inventive method compression is achieved by the interaction between a driver gas and a driven gas. Reasonable cycle compression ratios are desirable, say, about 8-10, and also high peak cycle temperatures are advantageous. Typically, both temperature and speed of sound of the driver gas will exceed those of the driven gas by about 2 or more. As a result of this it is not possible to couple efficiently the output potential of the driver gas to the energy absorbed by the driven gas unless the compression ratio of the driven gas is low. Accordingly, the inventive method contemplates carrying out a large over-all compression ratio in a series of small steps or stages to increase the efficiency of energy transfer from the driver gas to the driven gas.

While any number of compression steps or stages may be employed in keeping with the inventive concept, apparatus for carrying out a two-stage compression is illustrated in the drawings.

Referring to FIG. 1, the apparatus there shown comprises a blower 10, a low pressure energy exchanger 11, a high pressure energy exchanger 12, a combustor 13, and a turbine 14 which drives a load 15 by rotating a shaft 16.

The blower 10, which may be of any suitable construction, draws air from the atmosphere through its inlet 17 and discharges it through an outlet 18. This outlet 18 is connected in fluid conducting communication via duct 19 with a plenum chamber 20 shown in FIG. 2. This plenum chamber is arranged at one end of the low pressure energy exchanger 11 which in FIG. 2 is schematically illustrated as including a multiplicity of elongated horizontal tubes or chambers 21. In reality, these tubes 21 are arranged as an annular series so that their left ends, as viewed in FIG. 2, may be successively traversed by a rotating nozzle 22. This nozzle 22 is shown as arranged within the plenum chamber 20 and is rotated at the desired angular velocity by any suitable means (not shown). For a more complete illustration and description of energy exchanger apparatus having stationary tubes, a plenum chamber at one end thereof and a rotating nozzle within such plenum chamber, reference is made to U.S. Patent 2,526,618.

Except for a closure plate 23 not shown in FIG. 2 but illustrated in FIG. 3 and which is carried on the trailing side of the nozzle 22 to cover one or more tubes 21, all other tubes 21 are in communication with the plenum chamber 20. As nozzle 22 rotates it moves successively past the left ends of tubes 21, as does also closure plate 23.

Nozzle 22 is shown as connected in fluid conducting communication by a stationary duct 24 to another plenum chamber 25. This plenum chamber 25 is arranged at the right end of the high pressure energy exchanger 12 as illustrated in FIG. 2. High pressure energy exchanger 12 is similar in construction to low pressure energy exchanger 11 and thus includes an annular series of elongated horizontal tubes or chambers 26. Tubes 26 are dimensioned so that the individual volume of one of such tubes is less than that for one of the tubes 21. Rotatably arranged within plenum chamber 25 is a nozzle 28 which traverses the right ends of tubes 26 successively. This nozzle 28 may also be rotated by any suitable means (not shown). This nozzle 28 further carries a closure plate 29 on the trailing side thereof, this plate being illustrated in FIG. 3 but not in FIG. 2.

At the other or left end of the high pressure energy exchanger 12 is arranged another plenum chamber 30. The interior of this chamber communicates with the left ends of the tubes 26 except for those which are closed successively by a rotating nozzle 31 arranged with plenum chamber 30. Here again, this nozzle 31 may be rotated by any suitable means (not shown). This nozzle 31 also carries a closure plate 32 on the trailing side thereof, this plate being illustrated in FIG. 3 but not in FIG. 2. Except for those tubes 26 which are opposite the mouth of nozzle 31 and the closure plate 32 carried thereby at any given moment, the balance of these tubes are open and in communication with plenum chamber 30.

Adverting to nozzle 28, the same is shown as being in communication with a main outlet duct 33 which extends exteriorly of plenum chamber 25. This duct 33 communicates with inlet 34 for turbine 14 which also has an outlet 27, as shown in FIG. 1. Extending from and in fluid conducting communication with main outlet duct 33 is a branch duct 35 which leads to combustor 13. Fuel of any suitable type is controllingly introduced into the chamber of combustor 13 by any suitable means, such fuel feed being represented by the line 36. The products of combustion generated in the chamber of combustor 13 are led via duct 38 to an in fluid conducting communication with nozzle 31 rotatably arranged within plenum chamber 30.

This plenum chamber 30 is also shown as being in fluid conducting communication with a rotating nozzle 39 the mouth of which is adapted to traverse successively the open right ends of tubes 21 of low pressure energy exchanger 11, as illustrated in FIG. 2. Nozzle 39 may be rotated by any suitable means (not shown). Nozzle 39 carries a closure plate 40 on the trailing side thereof which plate is illustrated in FIG. 3 but not in FIG. 2. Except for the right ends of those tubes 21 of low pressure energy exchanger 11 which are covered at a given time by the mouth of nozzle 39 and its closure plate 40, the balance of these tubes are open to the atmosphere. Exhaust from the open right ends of tubes 21 is represented by the arrow 41.

Since the same things occur in each of the tubes 21 for the low pressure energy exchanger 11 and in each of the tubes 26 of the high pressure energy exchanger 12, the operation can best be understood by explaining what happens in one of each of these tubes during one complete revolution of the associated nozzles. To this end reference is made to the diagram in FIG. 3. Actually this figure illustrates two wave diagrams, the one on the left for low pressure energy exchanger 11 and the other on the right for high pressure energy exchanger 12. In each the abscissa represents the axial distance along the length of the respective exchanger tube, and the ordinate represents the developed circumference of the respective exchanger and also time.

Air derived from blower 10 enters plenum chamber 20 from which it enters the left end of a given tube 21, and flows toward the right end. This rightward flow continues until the interface between the body of entering air and the body of spent low stage driver gas from a previous cycle being exhausted approaches the right end of the tube. When the tube under consideration is filled with the fresh charge of air, the closure plate 40 on nozzle 39 moves opposite the tube and closes off the right end of the same. This generates a hammer shock 50 which propagates through the air within the tube toward the left end thereof. The effect of this hammer shock 50 is to compress and elevate the temperature of the air within the tube.

Shortly thereafter the nozzle 29 is brought opposite the tube under consideration and this introduces low stage driver gas. The effect of the sudden opening of the tube to the low stage driver gas which has a higher pressure and temperature than that of the air charge within the tube so far subjetced only to the action of hammer shock 50, generates a driver shock 51. This driver shock 51 propagates from right to left through the tube and inasmuch as it is traveling through a gas which is at a higher temperature than that of the gas through which hammer shock 50 propagated driver shock 51 will travel faster through the tube and tend to overtake the hammer shock. While the hammer and low stage driver shock 50 and 51, respectively, may be focused at the left end of the tube under consideration so as to arrive there substantially simultaneously, the left end of the tube is shown as being closed by closure plate 23 to intercept separately the driver and hammer shocks. The effect of driver shock 51 on the air within the tube under consideration is to further compress it and elevate its temperature.

The introduction of low stage driver gas through nozzle 39 develops an interface represented by the broken line 52 between this driver gas and the air or driven gas. Continued flow of entering low stage driver gas through nozzle 39 moves the interface 52 from the right end of the tube toward the left end thereof.

Collector nozzle 22 at the left end of the tube is so disposed and sequenced that it withdraws air which has been subjected to the combined action of both low stage hammer and driver shocks 50 and 51, respectively.

At the appropriate time the supply of low stage driver gas through nozzle 39 is suddenly terminated. This has the effect of generating a fan 53 of expansion waves which propagate through the driver gas in the tube under consideration, moving from the right end of this tube toward its left end. At about the time the first of leading expansion waves 54 arrives at the left end of the tube under consideration, collector nozzle 22 ceases to be in communication with the tube under consideration which is thereupon immediately placed in communication with plenum chamber 20. The effect of the expansion fan 53 coupled with the fact that the right end of the tube is now communicating with the atmosphere as represented at 41 and also the fact that the pressure of air in plenum chamber 20 is slightly higher that atmospheric, all will cause the interface as represented by the broken line 52a to move from the left end of the tube toward the right end thereof. When this interface 52a arrives at the right end of the tube, the cycle is completed and repeats.

The shock compressed air collected by nozzle 22 is conducted via duct 24 to plenum chamber 25. This plenum chamber services the right ends of tubes 26 in high pressure energy exchanger 12. Considering a given tube 26, the driven gas enters the right end of this tube and moves toward the left until it fills the same, moving the interface between it and the spent high stage driver gas from the previous cycle. When this tube 26 is substantially filled with driven gas derived from the low pressure energy exchanger 11, the left end of this tube is suddenly closed by the closure plate 32 on the rotating nozzle 31. The effect of this is to generate a high stage hammer shock 60 which propagates through the driven gas moving from left to right in the tube. This hammer shock 60 operates to further compress the driven gas and elevate its temperature.

At an appropriate time thereafter the tube 26 under consideration is suddenly connected to the nozzle 31 which introduces high stage driver gas which impinges the hammer shock compressed charge of driven gas within the tube. The effect of this is to generate a high stage driver shock 61 which propagates through the driven gas, moving from the left end of the tube 26 under consideration toward the right end thereof. Because the driven gas through which this driver shock 61 propagates has been previously processed by hammer shock 60 and as a consequence has had its temperature and pressure increased, this driver shock will tend to overtake this hammer shock.

While the generation of driver shock 61 can be timed so that it will arrive at the right end of the tube 26 under consideration at substantially the same time as hammer shock 60 arrives there, this has not been illustrated. Rather a slight delay in arrival of driver shock 61 is depicted, both shocks 60 and 61 encountering closure plate 29 on collector nozzle 28.

The subsequent positioning of nozzle 28 opposite the right end of the tube 26 under consideration allows the twice shock compressed driven gas to be collected by this nozzle. Continued steady flow introduction of high stage driver gas into the left end of the tube through nozzle 31 develops an interface represented by broken line 62 between the driver and driven gases and displaces the driven gas to the right.

At the appropriate time nozzle 31 leaves the tube 26 under consideration and this sudden cut-off of driver gas generates a fan 63 of expansion waves the leading one 65 of which overtakes interface 62 at about the time it arrives at the right end of the tube. At this time collector nozzle 28 leaves the tube which places it in instant communication with plenum chamber 25.

The expansion fan 63, coupled with the fact that the pressure in plenum chamber 25 is slightly higher than that in plenum chamber 30, will cause a fresh charge of driven gas to enter the right end of the tube 26 under consideration and develop an interface represented by the broken line 62a between the fresh charge of driven gas and the spent high stage driver gas. This interface 62a moves from right to left along the tube. When interface 62 arrives at the left end of the tube the latter has been completely filled with a fresh charge of driven gas and the cycle is ready to repeat.

It is to be noted that in the two-stage energy exchanger embodiment of the inventive method illustrated the spent high stage driver gas is utilized directly as the low stage driver gas.

It is further to be noted that the high stage shock compressed air collected in nozzle 28 is used partly as drive fluid for turbine 14 and partly to combust fuel in combustor 13 the products of combustion resulting therefrom constituting the high stage driver gas introduced through nozzle 31.

It is also to be noted that the drive fluid supplied to turbine 14 is expanded in flowing therethrough and exhausted to atmosphere through outlet 27.

If an over-all compression ratio of 9, for example were to be processed in the two energy exchangers 11 and 12 each with a compression ratio of about 3, the following pressures and temperatures might typically be found in the various parts of the apparatus, where P represents pressure, T represents temperature and M represents the mass of air. It is assumed that atmospheric pressure is 1 and ambient temperature is 1.

In plenum 20:
 $P=1.03$
 $T=1$
 $M=1$

In nozzle 22 and plenum 25:
 $P=3$
 $T=1.4$
 $M=1$

In nozzle 28:
 $P=9$
 $T=2.7$
 $M=1$

In turbine inlet 34:
 $P=9$
 $T=2.7$
 $M=0.6$

In nozzle 31:
 $P=8.4$
 $T=5.5$
 $M=0.4$

In plenum 30 and nozzle 39:
 $P=2.8$
 $T=4$
 $M=0.4$

In exhaust 41:
 $P=1$
 $T=2.9$
 $M=0.4$

There are two main sources of losses in the exchange of energy between the driver and driven gases. The first source of loss is found in the shock processes that compress the driven gas. In this connection, as more efficient compression results the more shocks the driven gas is subjected to, so that, for example, subjecting the driven gas to four equal strength shocks will yield a more efficient compression than two equal strength shocks for the same overall compression ratio.

The second source of energy loss arises from the cut-off of the driver gas which generates an expansion fan. This fan decreases the pressure of the driver gas from that corresponding to the pressure of the driven gas at the driver-driven interface, to the discharge pressure level of the driver gas exhaust, and this must eventually be made equal to the charge pressure else the cycle will not repeat. Portions of the driver gas within the expansion fan exist at pressure and temperature levels which are below those of the steady flow conditions that existed while the interface was being pushed out of the tube, but the pressure and temperature levels are above those of the final exhaust conditions. Hence, within the expansion fan proper, there exist intermediate levels of energy. The energy exchange cannot be 100% efficient unless all of the driver gas expands isentropically to the initial charge pressure which is necessary to re-establish the cycle. The fact that intermediate energy levels exist in the driver expansion fan after driver cut-off represent losses in the energy exchange procedure. However, the cumulative energy level for a plurality of small compression stages can be made less than for a single large stage, and hence the over-all loss is reduced and the over-all efficiency of energy exchange is increased.

From the foregoing, it will be seen that the more compression stages there are, the more efficient the process. However, the very practical consideration of increased investment in capital equipment limits the stages to a reasonable number for the increased efficiency attained. In the apparatus illustrated in the drawings there is only a high stage and a low stage, but it will be understood that there can be one or more intermediate stages and the appended claims contemplate this. Thus, the low stage shock compressed air becomes a driven gas which is utilized in the high stage directly, or indirectly through one or more intermediate stages. Likewise, spent high stage driver gas becomes low stage driver gas directly, or indirectly through one or more intermediate stages. With a plurality of stages the size and tube volume for each energy exchanger would be successively reduced. For a two-stage apparatus, as illustrated, and with a compression ratio of 9, the low pressure energy exchanger 11 would have about three times the tube volume of the high pressure energy exchanger 12.

It will thus be seen that the present invention accomplishes the various objects stated, and is to be measured by the scope of the appended claims.

What is claimed is:

1. A method, which comprises introducing gaseous fluid into one end of a low stage chamber, closing the other end of said low stage chamber, to generate a low stage hammer shock which propagates through said fluid toward said one end of said low stage chamber, introducing low stage driven gas into said other end of said low stage chamber to impinge said fluid to generate a low stage driver shock which propagates through said fluid toward said one end of said low stage chamber, removing from said one end of said low stage chamber fluid which has been subjected to the combined action of both said low stage hammer and driver shocks, such low stage shock compressed fluid becoming a driven gas, introducing said driven gas into one end of a high stage chamber, closing the other end of said high stage chamber to generate a high stage hammer shock which propagates through said driven gas toward said other end of said high stage chamber, introducing high stage driver gas into said other end of said high stage chamber to impinge said driven gas to generate a high stage driver shock which propagates through said driven gas toward said one end of said high stage chamber, removing from said one end of said high stage chamber driven gas which has been subjected to the combined action of both said second stage hammer and driver shocks, withdrawing from said other end of said high stage chamber spent high stage driver gas which becomes said low stage driver gas, and exhausting from said other end of said low stage chamber spent low stage driver gas.

2. A method, which comprises introducing gaseous fluid into one end of a low stage chamber, closing the other end of said low stage chamber to generate a low stage hammer shock which propagates through said fluid toward said one end of said low stage chamber, introducing low stage driven gas into said other end of said low stage chamber to impinge said fluid to generate a low stage driver shock which propagates through said fluid toward said one end of said low stage chamber, removing from said one end of said low stage chamber fluid which has been subjected to the combined action of both said low stage hammer and driver shocks, such low stage shock compressed fluid becoming a driven gas, introducing said driven gas into one end of a high stage chamber, closing the other end of said high stage chamber to generate a high stage hammer shock which propagates through said driven gas toward said other end of said high stage chamber, combusting fuel the products of combustion resulting therefrom providing a high stage driver gas, introducing said high stage driver gas into said other end of said high stage chamber to impinge said driven gas to generate a high stage driver shock which propagates through said driven gas toward said one end of said high stage chamber, removing from said one end of said high stage chamber driven gas which has been subjected to the combined action of both said second stage hammer and driver shocks, withdrawing from said other end of said high stage chamber spent high stage driver gas which becomes said low stage driver gas, and exhausting from said other end of said low stage chamber spent low stage driver gas.

3. A method of generating a gaseous drive fluid for a mechanism, which comprises introducing air into one end of a low stage chamber, closing the other end of said low stage chamber to generate a low stage hammer shock which propagates through said air toward said one end of said low stage chamber, introducing low stage driven gas into said other end of said low stage chamber to impinge said air to generate a low stage driver shock which propagates through said air toward said one end of said low stage chamber, removing from said one end of said low stage chamber air which has been subjected to the combined action of both said low stage hammer and driver shocks, such low stage shock compressed air becoming a driven gas, introducing said driven gas into one end of a high stage chamber, closing the other end of said high stage chamber to generate a high stage hammer shock which propagates through said driven gas toward said other end of said high stage chamber, introducing high stage driver gas into said other end of said high stage chamber to impinge said driven gas to generate a high stage driver shock which propagates through said driven gas toward said one end of said high stage chamber, removing from said one end of said high stage chamber driven gas which has been subjected to the combined action of both said second stage hammer and driver shocks, utilizing part of such withdrawn shock compressed driven gas as drive fluid for said mechanism, utilizing another part of said withdrawn driven gas to combust fuel the products of combustion resulting therefrom constituting said high stage driver gas, withdrawing from said other end of said high stage chamber spent high stage driver gas which becomes said low stage driver gas, and exhausting from said other end of said low stage chamber spent low stage driver gas.

4. A method of generating a gaseous drive fluid for a mechanism, which comprises blowing air into one end of a low stage chamber, closing the other end of said low stage chamber to generate a low stage hammer shock which propagates through said air toward said one end of said low stage chamber, introducing low stage driven gas into said other end of said low stage chamber to impinge said air to generate a low stage driver shock which propagates through said air toward said one end of said low stage chamber, removing from said one end of said low stage chamber air which has been subjected to the combined action of both said low stage hammer and driver shocks, such low stage shock compressed air becoming a driven gas, introducing said driven gas into one end of a high stage chamber, closing the other end of said high stage chamber to generate a high stage hammer shock which propagates through said driven gas toward said other end of said high stage chamber, introducing high stage driver gas into said other end of said high stage chamber to impinge said driven gas to generate a high stage driver shock which propagates through said driven gas toward said one end of said high stage chamber, removing from said one end of said high stage chamber driven gas which has ben subjected to the combined action of both said second stage hammer and driver shocks, expanding a part of such withdrawn shock compressed driven gas through said mechanism, spent drive fluid being exhausted to atmosphere, utilizing another part of said withdrawn driven gas to combust fuel the products of combustion resulting therefrom constituting said high stage driver gas, withdrawing from said other end of said high stage chamber spent high stage driver gas which becomes said low stage driver gas, and exhausting to atmosphere from said other end of said low stage chamber spent low stage driver gas.

References Cited

UNITED STATES PATENTS 3,076,422    2/1963    Spalding    230—69 X
3,232,334    2/1966    Barnes    230—67 X ROBERT M. WALKER, *Primary Examiner.*